United States Patent
Cho et al.

(10) Patent No.: US 7,221,952 B2
(45) Date of Patent: May 22, 2007

(54) METHOD FOR PROCESSING ADDRESS OF SHORT MESSAGE SERVICE CENTER IN IMT-2000 ASYNCHRONOUS NETWORK

(75) Inventors: Il-Weon Cho, Seoul (KR); Hyung-Joon Cho, Gyeonggi-do (KR); Hee-Hyeok Hahm, Seoul (KR); Sang-Yun Lee, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 10/523,859

(22) PCT Filed: Mar. 31, 2003

(86) PCT No.: PCT/KR03/00639

§ 371 (c)(1),
(2), (4) Date: Apr. 25, 2005

(87) PCT Pub. No.: WO2004/019628

PCT Pub. Date: Mar. 4, 2004

(65) Prior Publication Data

US 2005/0233756 A1 Oct. 20, 2005

(30) Foreign Application Priority Data

Aug. 26, 2002 (KR) .................. 10-2002-0050646

(51) Int. Cl.
*H04Q 7/20* (2006.01)
(52) U.S. Cl. .................... 455/466; 455/412.1; 455/433
(58) Field of Classification Search ............... 455/453, 455/466, 433, 412.1
See application file for complete search history.

(56) References Cited

U.S. PATENT DOCUMENTS

| 6,745,041 B2 * | 6/2004 | Allison et al. ............... 455/466 |
| 6,891,811 B1 * | 5/2005 | Smith et al. ................. 370/310 |
| 2002/0052212 A1 * | 5/2002 | Aschir ......................... 455/466 |

FOREIGN PATENT DOCUMENTS

| EP | 1021056 | 7/2000 |
| KR | 1998-35956 | 8/1998 |
| KR | 2001-84294 | 9/2001 |
| WO | WO00-10294 | 2/2000 |

* cited by examiner

*Primary Examiner*—Joseph Feild
*Assistant Examiner*—David Q. Nguyen
(74) *Attorney, Agent, or Firm*—Ladas & Parry LLP (57) ABSTRACT

The present invention relates to a method for processing an address of a short message service center in a WCDMA network, including: a load centralization confirmation step where an operation control unit receives short message processing states from each short message service center, confirms load centralization states of each short message service center, and generates an operation message; a path setup step where a mobile switching center receives a short message from a mobile station, and sets up a transmission path of the short message according to the operation message; and an optimal transmission step where the mobile switching center transmits the short message from the mobile station to the corresponding short message service center through the transmission path according to the result of the path setup step. When a lot of messages are centralized to a specific short message service center due to call habits of subscribers, some subscribers of the short message service center arc distributed to another short message service center, and thus service center reception ability is predictable. It is also possible to actively cope with civil appeals and troubles.

4 Claims, 8 Drawing Sheets

| 8 | 7 | 6 | 5 | 4 | 3 | 2 | 1 | |
|---|---|---|---|---|---|---|---|---|
| | \multicolumn{7}{c|}{RP-Destination Address number IEI} | octet 1 |

| | |
|---|---|
| Length of PR-Destination Address contents | octet 2 |
| 1 ext / type of number / Numbering plan identification | octet 3 |
| Number digit 2 / Number digit 1 | octet 4 |
| Number digit 4 / Number digit 3 | octet 5 |
| | ⋮ |

METHOD FOR PROCESSING ADDRESS OF SHORT MESSAGE SERVICE CENTER IN IMT-2000 ASYNCHRONOUS NETWORK

TECHNICAL FIELD

The present invention relates to a method for processing an address of a short message service center in an IMT-2000 asynchronous network which uses a mobile station ISDN (MSIDSN) as a short message service center address stored in a mobile station defined in 3GPP for routing and subscriber distribution of the short message service center in an UMTS (Universal Mobile Telecommunication Service) network, instead of using a real short message service center address.

BACKGROUND ART

In general, in 3GPP, when an MS (Mobile Station) transmits a short message, the short message is transmitted to a corresponding SC (Service Center) based on an SC address from the MS. Here, the SC address from the MS is a secret number of the SC. That is, the SC set up in the MS processes the message.

In this method, when an SMS (Short Message Service) provider and a core network provider are different, subscribers can select the SMS provider.

Figure 1:
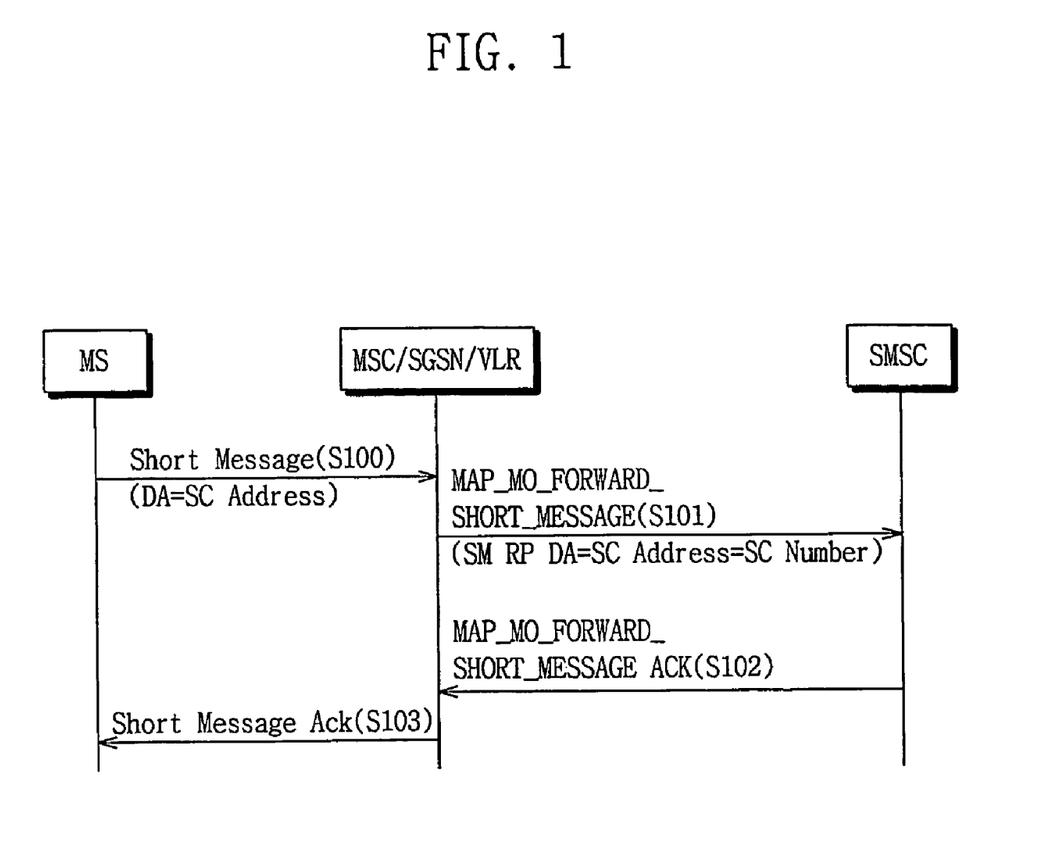
FIG. 1 is a flowchart showing a conventional method for processing short message service transmission.

Referring to FIG. 1, when an SC address is designated as an SC number, if an MS 10 transmits a short message, it is transmitted to an MSC/SGSN/VLR 20 with the SC address stored in the MS 10 (S100).

The MSC/SGSN/VLR 20 transmits a message MAP_MO_FORWARD_SHORT_MESSAGE to an SMSC (Short Message Service Center) 30 having the SC address (S102). Here, the transmitted SC address is the SC number, and the MSC/SGSN/VLR 20 manages routing information of the corresponding SMSC 30 by SC numbers.

The SMSC 30 processes the short message, and outputs a message MAP_MO_FORWARD_SHORT_MESSAGE_CK to the MSC/SGSN/VLR 20. The MSC/SGSN/VLR 20 outputs a short message response SHORT MESSAGE ACK to the MS 10 to notify that the short message has been successfully processed (S102 and S103).

Figure 2:
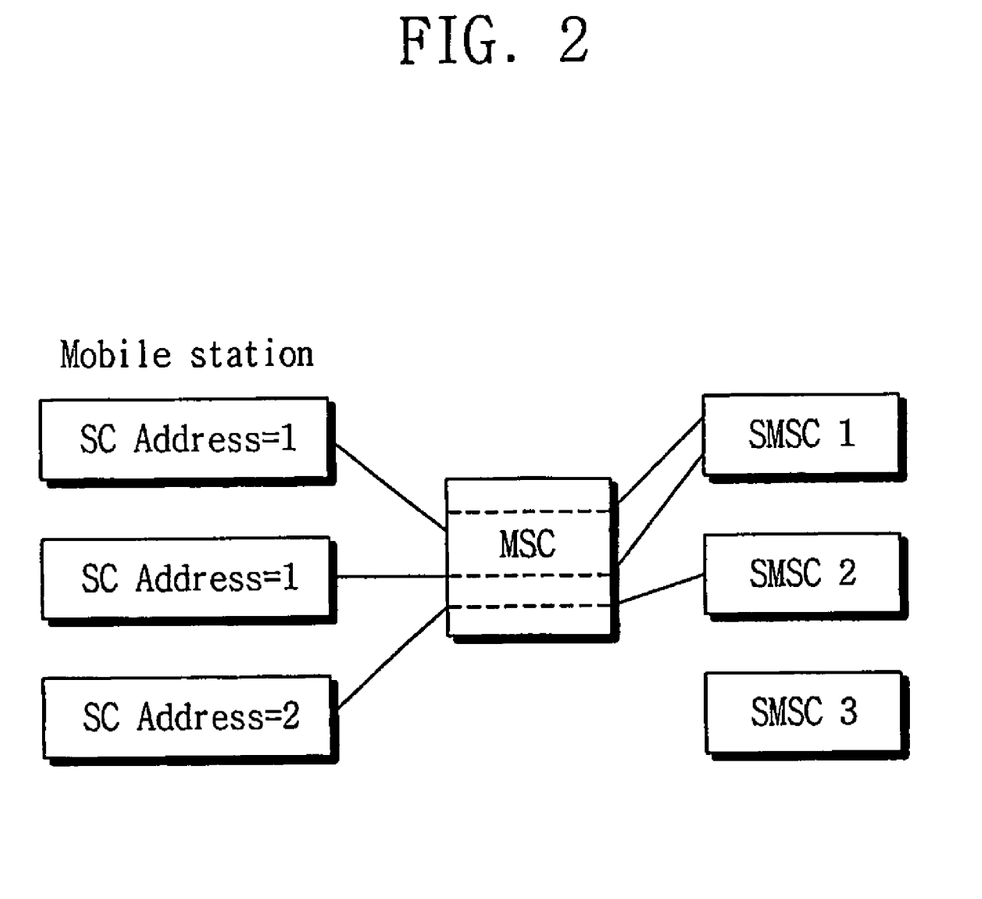
FIG. 2 is an exemplary diagram illustrating load centralization of a general short message service center.

However, when the SMS provider and the core network provider are identical, if the provider has a plurality of SC, a lot of messages may be centralized in a specific SMSC according to call habits of subscribers as shown in FIG. 2. That is, when the SC address means the secret number of the SC, the messages may not be evenly distributed to the SMSC. There is no way of distributing some subscribers of one SMSC to another SMSC, and thus SC reception ability is not predictable. It is also hard to actively cope with civil appeals and troubles.

DISCLOSURE OF INVENTION

An object of the present invention is to provide a method for processing an address of a short message service center in an IMT-2000 asynchronous network which can efficiently utilize the network by using a mobile station ISDN as a mobile switching center address stored in a mobile station defined in 3GPP for routing and subscriber distribution of the short message service center, instead of using a real mobile switching center address.

In order to achieve the above-described object of the invention, there is provided a method for processing an address of a short message service center in a WCDMA network, including: a load centralization confirmation step where an operation control unit receives short message processing states from each short message service center, confirms load centralization states of each short message service center, and generates an operation message; a path setup step where a mobile switching center receives a short message from a mobile station, and sets up a transmission path of the short message according to the operation message; and an optimal transmission step where the mobile switching center transmits the short message from the mobile station to the corresponding short message service center through the transmission path according to the result of the path setup step.

BRIEF DESCRIPTION OF THE DRAWINGS

FIG. 3 is a block diagram illustrating a network structure for processing a short message service which the present invention can be applied to;

BEST MODE FOR CARRYING OUT THE INVENTION

A method for processing an address of a short message service center in an IMT-2000 asynchronous network in accordance with the present invention will now be described in detail with reference to the accompanying drawings.

Figure 3:
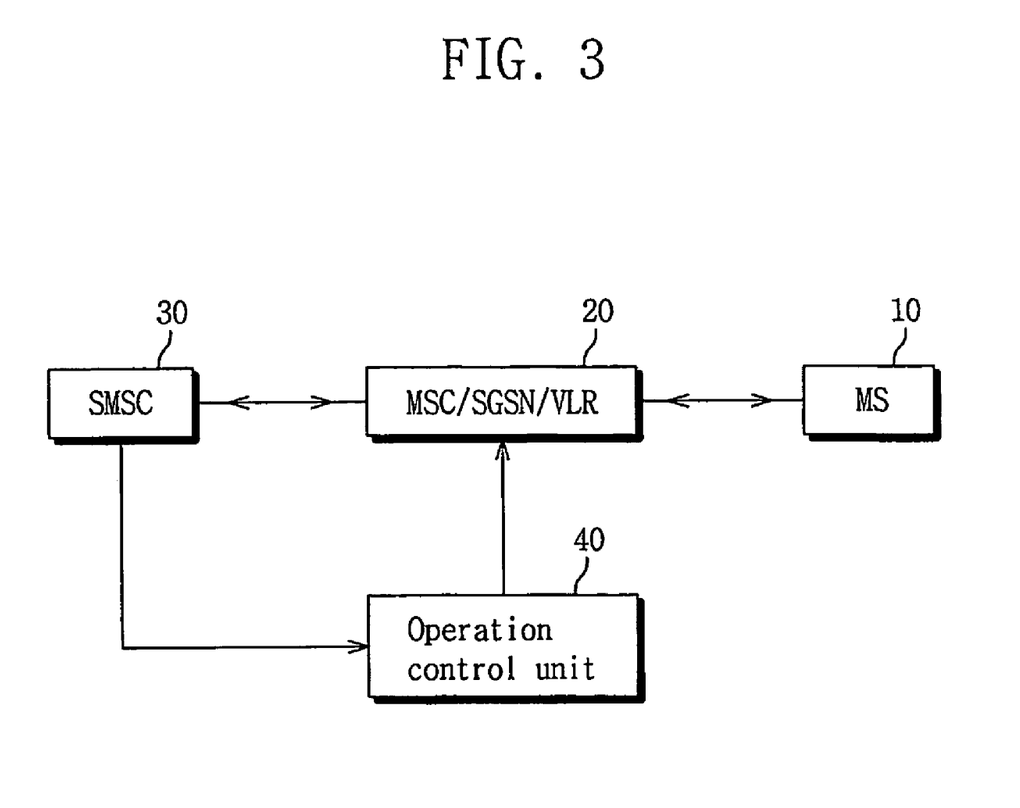

FIG. 3 is a block diagram illustrating a network structure for processing a short message service which the present invention can be applied to.

As illustrated in FIG. 3, the network structure is composed of an MS (Mobile Station) 10, an MSC/SGSN/VLR 20, a plurality of SMSC (Short Message Service Center) 30 linked to a plurality of MSC (Mobile Switching Center), HLR (Home Location Register), VMS/FMS (Voice Mail System/Fax Mail System), IVR (Interactive Voice Response) and other SME (Short Message Entity), for providing a supplementary service for enabling mobile phone subscribers to transmit/receive short messages in the form of characters, and an operation control unit 40 for outputting an operation message to the MSC/SGSN/VLR 20 and controlling variations of a message transmission path according to real-time statistical data of short message processing states of each SMSC 30.

The operation of the present invention will now be explained.

Figure 5:
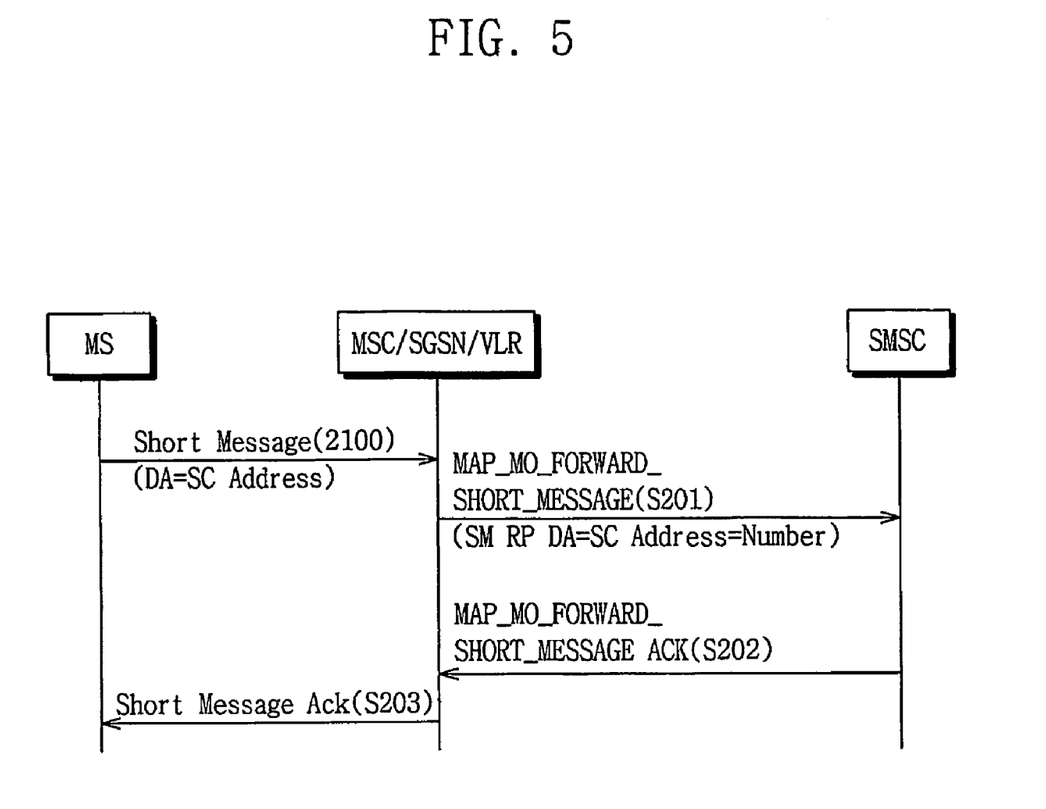
FIG. 5 is a flowchart showing a method for processing short message service transmission in accordance with the present invention.

FIG. 5 is a flowchart showing a method for processing short message service transmission in accordance with the present invention.

Figure 4:
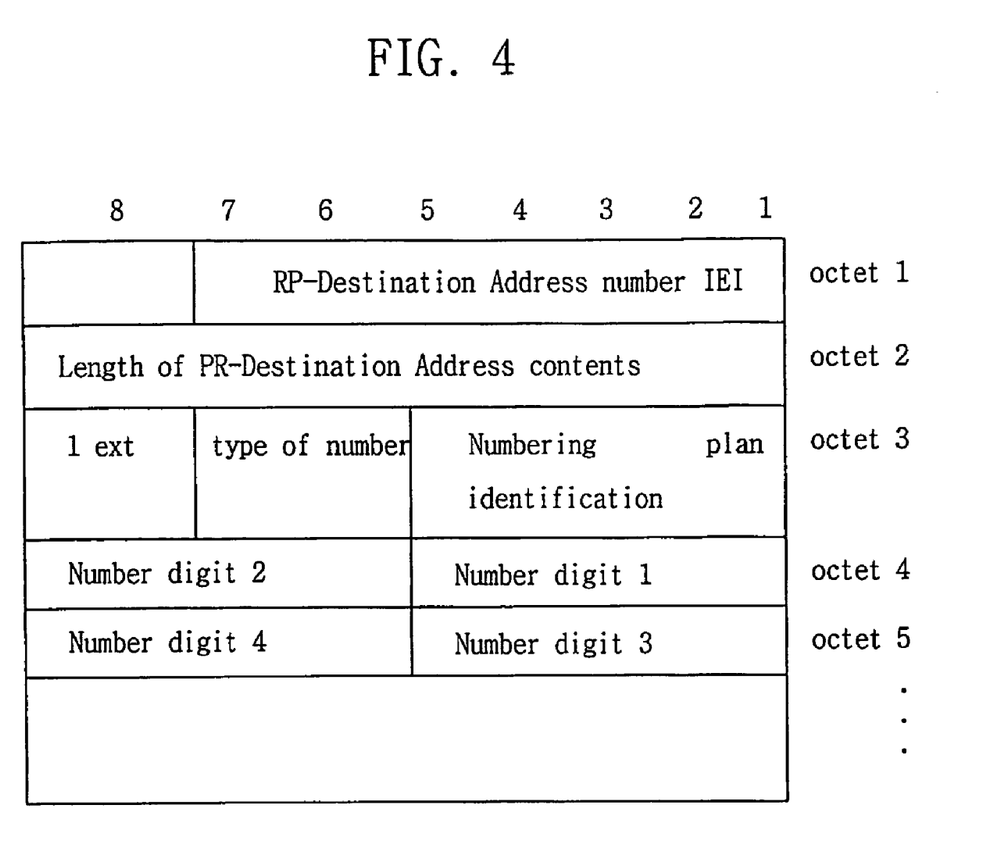
FIG. 4 is an exemplary diagram illustrating a format of a destination address transmitted to a mobile switching center in accordance with the present invention.

As depicted in FIG. 5, when an SC address is an MSISDN, if the MS 10 transmits a short message, it is transmitted to the MSC/SGSN/VLR 20 with the SC address stored in the MS 10 (S200). Here, the SC address is stored in an SIM (Subscriber Information Module) card of the MS 10. When the subscriber transmits the short message, the SC address is included in a DA (Destination Address) of RP (Release Protocol)-data, and transmitted to the MSC/SGSN/VLR 20 (S200). FIG. 4 shows a format of the DA.

As shown in FIG. 4, octet 1 denotes an intrinsic value of the DA (RP-data has IDs by parameters, and octet 1 shows an intrinsic ID of the RP-data), and octet 2 denotes a whole length of parameters. 1 ext of octet 3 always implies '1', and type of number is generally international, national or unknown. Real numbers are used from octet 4.

The MSC/SGSN/VLR 20 transmits a message MAP_MO_FORWARD_SHORT_MESSAGE to the SMSC 30 having the corresponding SC address (S201). The SC address is the MSISDN of the subscriber.

Here, the MSC/SGSN/VLR 20 requires rooting information to decide which SMSC 30 it should transmit the message to by using the MSISDN. The operation control unit 40 receives the short message processing states from each SMSC 30 in the real time, and confirms load centralization of each SMSC (the SMSC processing a relatively small number of short messages is regarded as a minimum load centralization SMSC in the real time). When the SMSC shows load centralization, the operation control unit 40 transmits an operation message to the MSC/SGSN/VLR 20 in order to newly set up a short message transmission path to the minimum load centralization SMSC. Thus, the MSC/SGSN/VLR 20 has transmission path information (routing information).

The SMSC 30 processes the short message and outputs a message MAP_MO_FORWARD_SHORT_MESSAGE_ACK to the MSC/SGSN/VLR 20. The MSC/SGSN/VLR 20 outputs a short message response SHORT MESSAGE ACK to the MS 10 to notify that the short message has been successfully processed (S202 and S203).

Figure 6:
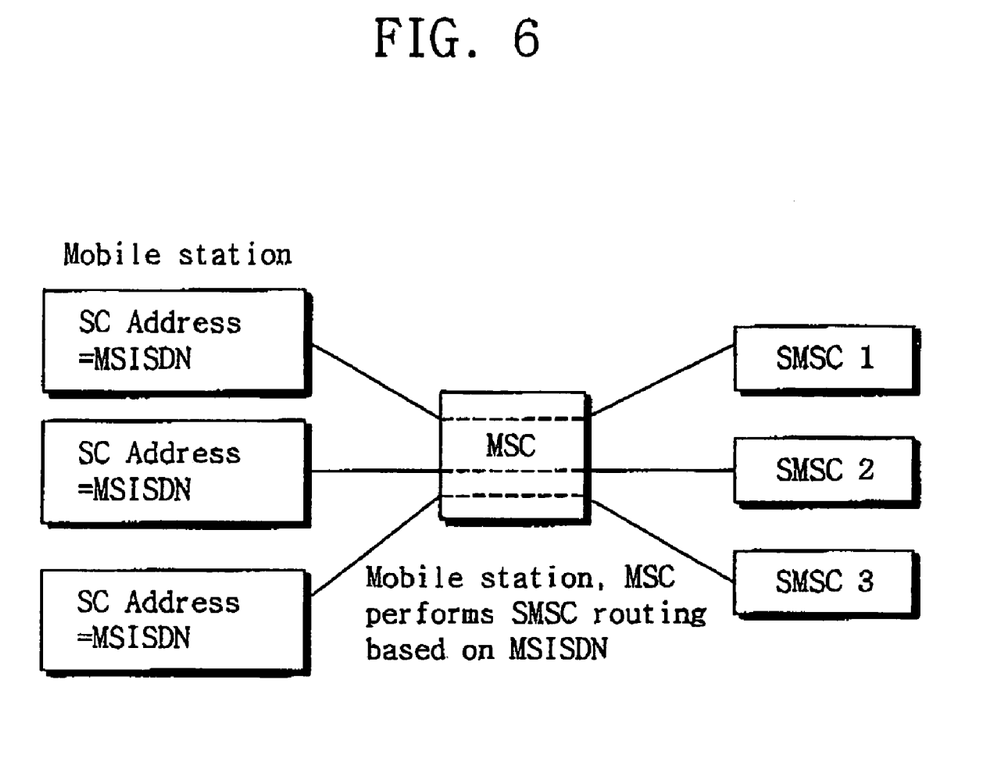
FIG. 6 is an exemplary diagram illustrating routing from the mobile switching center to short message service centers based on MSIDSN in accordance with the present invention.

Accordingly, when the SC address is the MSISDN, as shown in FIG. 6, the subscribers can be efficiently distributed to the SMSC 30 according to office data operations of the MSC/SGSN/VLR 20. That is, when SMSC call attempts are not balanced due to call habits of the subscribers, load can be reduced by changing routing information of some subscribers of the SMSC 30 (for example, by prefixes).

Figure 7:
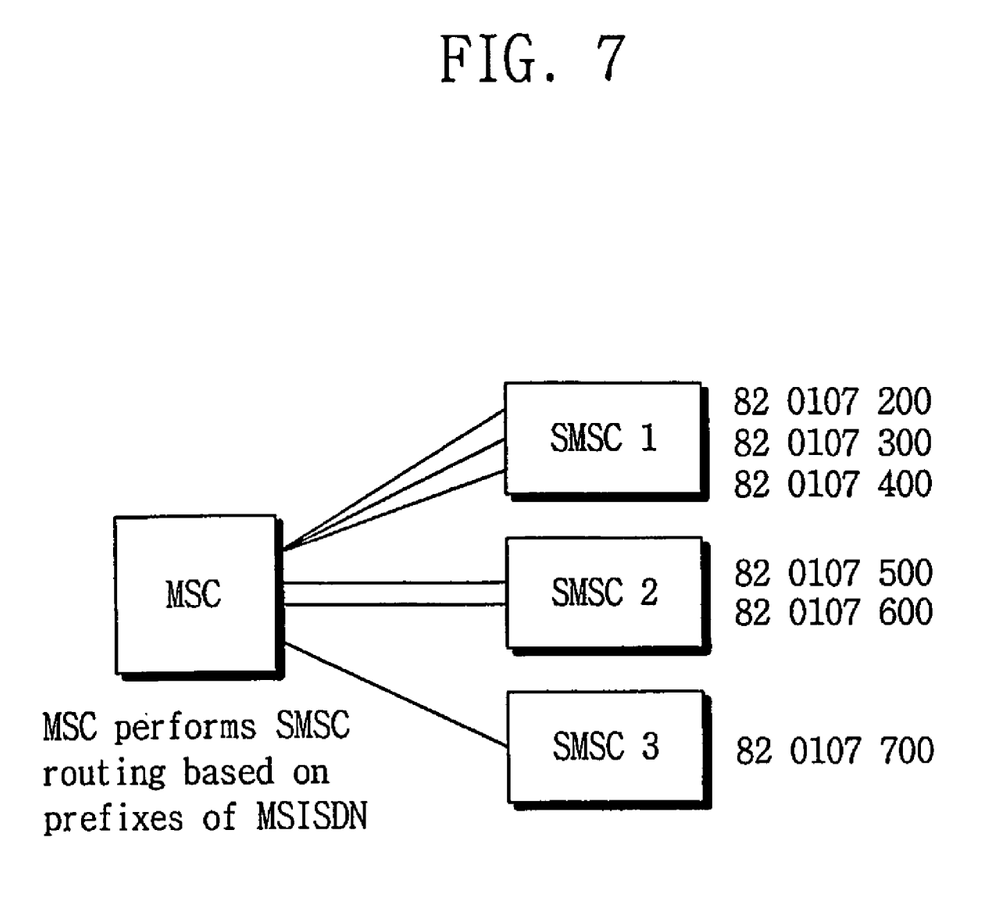
FIG. 7 is an exemplary diagram illustrating load concentration of the short message service center in accordance with the present invention.
Figure 8:
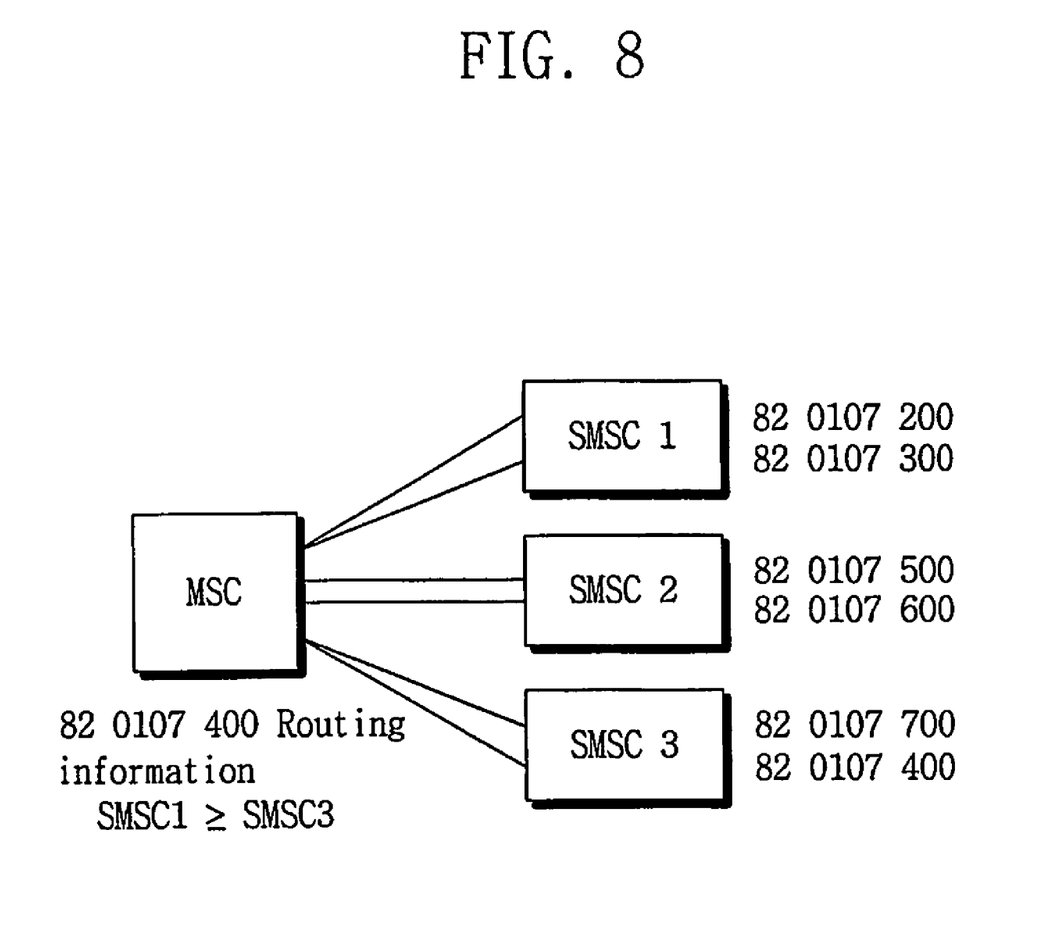
FIG. 8 is an exemplary diagram illustrating routing for subscriber distribution in load centralization in accordance with the present invention.

For example, the MSC/SGSN/VLR 20 performs SMSC routing by prefixes of subscribers as shown in FIG. 7. When load increases in SMSC1 due to call habits of the subscribers, some of the prefixes routed to SMSC1 are controlled to be routed to SMSC3 as shown in FIG. 8. As a result, load of SMSC1 is adjusted.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

INDUSTRIAL APPLICABILITY

As described above, when a lot of messages are centralized to a specific SMSC due to call habits of subscribers, the method for providing the short message service in the WCDMA network distributes some subscribers of the SMSC to another SMSC, and thus SC reception ability is predictable. It is also possible to actively cope with civil appeals and troubles.

What is claimed is:

1. In a method for processing a short message in a mobile communication network including a mobile switching center for switching calls, a short message service center for providing a short message service, and an operation control unit for operating and managing the short message service center, a method for processing an address of a short message service center in a WCDMA network, comprising:
  a load centralization confirmation step where the operation control unit receives short message processing states from each short message service center, confirms load centralization states of each short message service center, and generates an operation message for selecting a minimum load centralization short message service center;
  a path setup step where the mobile switching center receives a short message with MSISDN designated as the SC address, from a mobile station, and sets up a transmission path of the short message according to the operation message; and
  an optimal transmission step where the mobile switching center transmits the short message from the mobile station to the corresponding short message service center through the transmission path according to the result of the path setup step.

2. The method of claim 1, wherein the load centralization confirmation step comprises a step where the operation control unit
  receives the short message processing states from each short message service center,
  confirms a minimum load centralization short message service center according to real-time statistical data, and
  transmits the operation message for requesting path setup variations to the mobile switching center,
so that the minimum load centralization short message service center can process newly-transmitted short messages.

3. The method of claim 1, wherein,
  in the path setup step, the mobile switching center sets up the short message service center corresponding to address information included in the operation message from the operation control unit as a minimum load centralization short message service center to set up the transmission path of the short message, and
  in the optimal transmission step, the mobile switching center transmits the short message from the mobile station to the minimum load centralization short message service center through the transmission path.

4. The method of claim 2, wherein,
  in the load centralization confirmation step, the operation control unit decides the short message service center processing a relatively small number of short messages as the minimum load centralization short message service center in the real time according to the short message processing states from each short message service center.

* * * * *